US012789121B2

(12) United States Patent
Cloud et al.

(10) Patent No.: US 12,789,121 B2
(45) Date of Patent: Nov. 10, 2026

(54) METHOD OF MANUFACTURING A GRADIENT DENSITY, THERMALLY BONDED, CONVOLUTED ROLL DEPTH FILTER CARTRIDGE

(71) Applicant: Parker-Hannifin Corporation, Cleveland, OH (US)

(72) Inventors: Daniel M. Cloud, Weatherford, TX (US); Jack David Burns, Aledo, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 1080 days.

(21) Appl. No.: 17/400,754

(22) Filed: Aug. 12, 2021

(65) Prior Publication Data

US 2021/0370201 A1 Dec. 2, 2021

Related U.S. Application Data

(63) Continuation of application No. PCT/US2020/018126, filed on Feb. 13, 2020.

(60) Provisional application No. 62/892,187, filed on Aug. 27, 2019, provisional application No. 62/804,809, filed on Feb. 13, 2019.

(51) Int. Cl.

| | |
|---|---|
| ***B01D 29/11*** | (2006.01) |
| ***B01D 39/14*** | (2006.01) |
| ***B01D 46/00*** | (2022.01) |
| ***B01D 46/24*** | (2006.01) |

(52) U.S. Cl.
CPC ............ *B01D 29/111* (2013.01); *B01D 39/14* (2013.01); *B01D 46/0001* (2013.01); *B01D 46/2411* (2013.01); *B01D 2201/182* (2013.01); *B01D 2239/0622* (2013.01); *B01D 2239/0627* (2013.01); *B01D 2239/10* (2013.01); *B01D 2239/1208* (2013.01)

(58) Field of Classification Search
None
See application file for complete search history.

(56) References Cited

U.S. PATENT DOCUMENTS

| | | | | |
|---|---|---|---|---|
| 4,661,132 | A | 4/1987 | Thornton et al. | |
| 5,639,370 | A * | 6/1997 | Fall | B01D 29/111 210/489 |
| 5,827,430 | A | 10/1998 | Perry, Jr. et al. | |
| 6,986,427 | B2 | 1/2006 | Aune et al. | |
| 8,062,523 | B2 | 11/2011 | Cloud et al. | |

(Continued)

FOREIGN PATENT DOCUMENTS

| | | | | |
|---|---|---|---|---|
| CN | 106536017 A * | 3/2017 | | B01D 39/14 |
| JP | 2012245771 A | 12/2012 | | |

(Continued)

OTHER PUBLICATIONS

MT CN106536017 (Year: 2017).*
MT JP2012245771 (Year: 2012).*

*Primary Examiner* — Peter Keyworth
(74) *Attorney, Agent, or Firm* — Reinhart Boerner Van Deuren P.C.

(57) ABSTRACT

A gradient density filter element, and associated method, and an associated apparatus are provided. The gradient density filter element includes a gradient density filter media formed via compression during winding of a layer of filter media into a cylindrical roll.

14 Claims, 7 Drawing Sheets

(56) References Cited

U.S. PATENT DOCUMENTS

| | | | |
|---|---|---|---|
| 9,101,860 | B2 | 8/2015 | Green et al. |
| 9,731,966 | B2 | 8/2017 | Green et al. |
| 10,179,426 | B2 | 1/2019 | Stifter et al. |

FOREIGN PATENT DOCUMENTS

| | | | |
|---|---|---|---|
| KR | 100263172 | B1 | 8/2000 |
| KR | 1020090119075 | A | 11/2009 |
| KR | 101026928 | B1 | 4/2011 |
| KR | 2016/0080930 | A | 7/2016 |
| KR | 1020160083561 | A | 7/2016 |
| KR | 1020190023964 | A | 3/2019 |
| WO | WO 2017/196653 | A1 | 11/2017 |

* cited by examiner

METHOD OF MANUFACTURING A GRADIENT DENSITY, THERMALLY BONDED, CONVOLUTED ROLL DEPTH FILTER CARTRIDGE

CROSS-REFERENCE TO RELATED PATENT APPLICATIONS

This patent application is a continuation of co-pending U.S. PCT Patent Application No. PCT/US2020/018126, filed Feb. 13, 2020, which is now Pending This patent application claims the benefit of U.S. Provisional Patent Application No. 62/892,187, filed Aug. 27, 2019, and U.S. Provisional Patent Application No. 62/804,809 filed Feb. 13, 2019, the entire teachings and disclosure of which are incorporated herein by reference thereto.

FIELD OF THE INVENTION

The present invention relates generally to filtration and filter elements, and more particularly to manufacturing methods and apparatuses for manufacturing filter elements, and even more particularly to a method and apparatus for manufacturing a gradient density, thermally bonded, convoluted roll depth filter cartridge, and the resultant filter element.

BACKGROUND OF THE INVENTION

Gradient density porous structures are useful and beneficial to enhance particle filtration and droplet separation mechanisms. Constructing a truly profound gradient density structure, as taught in U.S. Pat. No. 5,827,430 A to Perry et al. titled, "Coreless and Spirally Wound Non-Woven Filter Element," the entire teachings of which are incorporated by reference herein, is complicated and relatively expensive. Layers have to be differentiated and constructed of fibers of various sizes. Individual layers have to be built separately and later merged together to form a filter matrix requiring multiple manufacturing operations.

In other processes, it may be necessary to employ separate heating operations to separate sections of the filter media to achieve a gradient density across the thickness of the filter media. U.S. Pat. No. 4,661,132 to Thorton et al. titled, "Thermally Formed Gradient Density Filter," the entire teachings of which are incorporated by reference herein, describes a gradient density filter formed by first forming a batt of thermoplastic and non-thermoplastic fibers, then cutting the batt into sections, then heating portions of the batt to partially fuse the fibers thereof. This heating operation increases the density of these portions of the batt, thereby providing a gradient density.

As may be readily appreciated from the above, forming a gradient density porous structure such as a filtration media can be a relatively complex, multi-operation, process. This creates an undesirable cost in the manufacture of such porous structures, which is either born by the manufacturer or passed on to the consumer in the form of increased cost.

Accordingly, there is a need in the art for a method and apparatus which may be utilized to form a gradient density roll depth filter cartridge, and a need in the art for a gradient density roll depth filter cartridge formed thereby.

BRIEF SUMMARY OF THE INVENTION

The proposed application covers a unique simplified method of manufacturing a gradient density filter cartridge.

The manufacturing method incorporates a compression method facilitated by state-of-the art process control equipment and logic. The described compression method is independent to the type of polymeric filter media layers used, which could include, but are not limited to, melt-blown material, spun-blown material, non-woven material, woven material and needled felt material. Non-polymer filter media could also be used, with the additional application of a bonding agent.

This method and apparatus utilizes the new method will utilize controlled logic applied force compression to set specific media layer porosity differentiation as the same media layer is convolutedly rolled upon itself to form a cylindrical depth filter tube designed to perform different specified separation functions. The polymeric fibers will be heated up to a pre-molten state using, for non-limiting example, IR lamps, just before undergoing compression. Pinch rolls can also be used to form the media layers before compression. The post compression fiber matrix will be set during cooling to have a new specified layer porosity and density.

The compression force applied to the filter tube will change as the cartridge is wound to achieve a specific layer porosity and density. One embodiment includes the use of a servo roller and a controller (not shown) that controls the force applied by a compression roller against the filter cartridge during the rolling operation, depending on the media material and diameter of the cartridge as it is being rolled, among other factors, to achieve the desired porosity and density.

The new processing method produces a highly desired extreme gradient density while using a feed filter media of only one basis weight and resulting porosity. Other methods can require numerous layers of different filter media to achieve like gradient density characteristics.

In one aspect, the invention provides a method of manufacturing a depth-type filter cartridge. An embodiment of such a method includes exposing a layer of polymeric or non-polymeric filter media material to a heat source to heat the material to a pre-molten state, forming the filter media material into a cylindrical roll having a desired porosity and density using variable compression against the layer of filter media material as it is being wound into the cylindrical roll based on at least one of a current diameter of the media roll and the media material, and subsequently cooling the cylindrical roll to set fibers comprising the filter media material.

In embodiments according to this aspect, the step of exposing a layer of polymeric or non-polymeric filter media material to a heat source includes exposing the layer to radiant heat generated by one or more heat lamps. The step of exposing the layer to radiant heat generated by one or more heat lamps can include utilizing a heat lamp above a top surface of the layer, and below a bottom surface of the layer.

In embodiments according to this aspect, the step of using variable compression includes applying a compressive force against the cylindrical roll of filter media material while the layer of filter media material is being wound into the cylindrical roll. The step of applying the compressive force can include applying a compressive force with a compression roller arranged adjacent to the cylindrical roll. The step of applying the compressive force with a compression roller may include compressing a portion of the cylindrical roll of filter media material between an outer diameter of the compression roller and an outer diameter of a winding element upon which the layer of filter media material is being wound.

In embodiments according to this aspect, the step of applying the compressive force with a compression roller may also include varying the compressive force. The step of varying the compressive force includes moving the compression roller toward or away from the cylindrical roll. The step of moving the compression roller toward or away from the cylindrical roll can include changing a distance between a rotational axis of the compression roller and a rotational axis of a winding element upon which the layer of filter media material is being wound. The step of changing the distance may include using a motor to change the distance. Alternatively, the step of changing the distance may include using a linear actuator to change the distance.

In embodiments according to this aspect, the step of using variable compression against the layer of filter media material as it is being wound into the cylindrical roll based on at least one of a current diameter of the media roll and the media material includes monitoring a current state of the cylindrical roll of filter media using one or more sensors and communicating information pertaining of the current state to a controller. The method may also include a step of varying a compressive force by sending an instruction from the controller to an actuation arrangement.

In another aspect, the invention provides an apparatus for manufacturing a depth-type filter cartridge. An embodiment of such an apparatus includes media feed rolls for feeding a layer of filter media material from a roll of filter media, one or more heating elements for heating the layer of filter media material, a winding element for winding the layer of filter media material into a cylindrical roll, and a compression element for applying a variable compressive force against a portion of the cylindrical roll as it is being wound about the winding element.

In embodiments according to this aspect, a pair of pinch rollers may be positioned upstream from the winding element relative to a direction of movement of the layer of filter media material. The one or more heating elements may be infrared lamps.

In embodiments according to this aspect, the compression element may be a compression roller. The compression roller is movable towards and away from the cylindrical roll using an actuation arrangement. The actuation arrangement may comprise a motor and a rack and pinion. The pinion is connected to an output shaft of the motor and the rack is formed on an actuating arm carrying the compression roller. Alternatively, the actuation arrangement may comprises a linear actuator.

In embodiment according to this aspect, the apparatus may also include a cooling device positioned downstream from the winding element relative to a direction of movement of the layer of filter media material for cooling the cylindrical roll.

In yet another aspect, the invention provides a depth-type filter element. An embodiment of such a depth type filter element includes a roll of gradient density filter media being subjected to a variable compressive force to vary a density and porosity of the filter media relative to at least a radial direction of the filter element, an open end cap at one end of the roll, and a closed end at another end of the roll.

In embodiments according to this aspect, the filter element may include a core or alternatively may be coreless.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
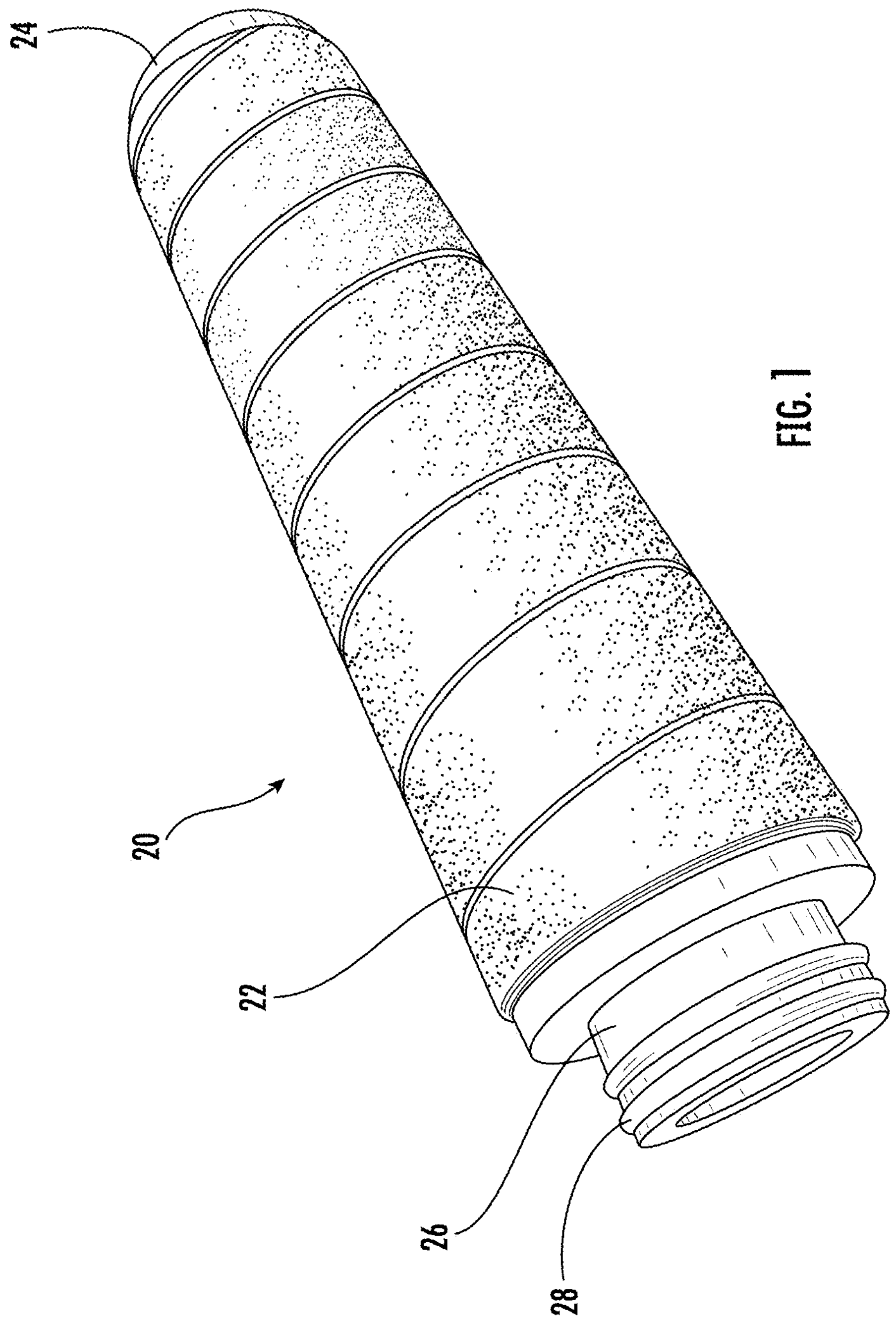
FIG. 1 is a perspective view of an exemplary embodiment of a filter element formed by a method and apparatus according to the teachings herein.

Turning now to the drawings, FIGS. 1-7 illustrate an apparatus and filter element formed by the apparatus. The filter element includes a gradient density formed via the use of a compression arrangement described below. With particular reference to FIG. 1, the same illustrates an exemplary embodiment of a filter cartridge, referred to herein as filter element 20 formed via an apparatus and method described herein. Filter element 20 includes a cylindrical roll of filter media 22, with a closed end cap 24 at one end, and an open end cap 26 at the other. The open end cap 28 employs one or more seals 28. The specific dimensions shown should be taken by way of example only, as those of skill in the art will readily appreciate that filter element 20 may be scaled up or down. Further, filter element 20 is not limited to a pair of o-ring type seals 28 as illustrated. Indeed, any type of seal typically used in filtration may be employed.

As introduced above, filter media 22 is a gradient density depth filtration filter media. As explained below, this gradient density, and hence gradient porosity, is achieved by applying a compressive force to filter media 22 after it has been heated, and while it is being wound. During the winding process, the compressive force applied may be varied such that the density and porosity changes relative to the radial and/or the axial direction. Filter media 22 may be any polymeric or non-polymeric filter media typically utilized in depth filtration applications.

Figure 2:
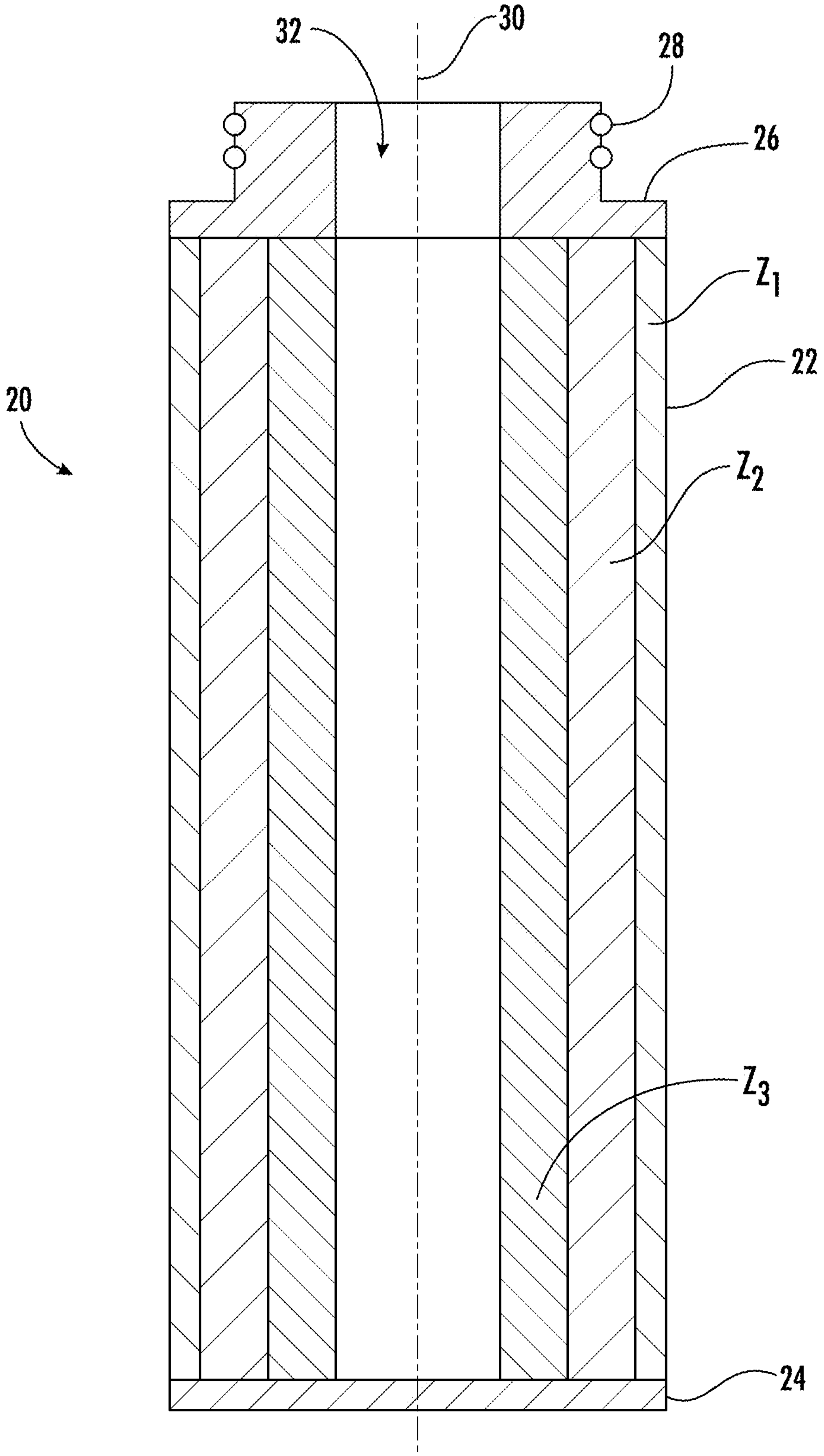
FIG. 2 is cross section of the filter element of FIG. 1, taken along its length.

Turning now to FIG. 2, the aforementioned variable compressive force results in a plurality of density zones, generally denoted as $Z_1$-$Z_3$. In FIG. 2, differing cross hatching is utilized for each of zones $Z_1$, $Z_2$, $Z_3$, but this is only to denote differing density/porosity characteristics, not different material. It is contemplated by the teachings herein, however, that in alternative embodiments each zone $Z_1$-$Z_3$ may be formed with a different media type. Further, although the gradient density/porosity is illustrated as varying only in the radial direction, it could also be varied axially, i.e. parallel to longitudinal axis 30.

Still referring to FIG. 2, filter element 20 includes a central bore 32 as shown. Central bore 32 may be coreless, as illustrated, or in other embodiments may utilize a core. By "coreless" it is meant that no interior structure within bore 32 is used to support filter media 22. Indeed, filter media 22 may be heated, formed, compressed, and cooled such that it exhibits a sufficient enough strength to withstand the pressure differentials in filtration applications. However, it is also entirely possible to incorporate a core within bore 32 for additional support.

Figure 3:
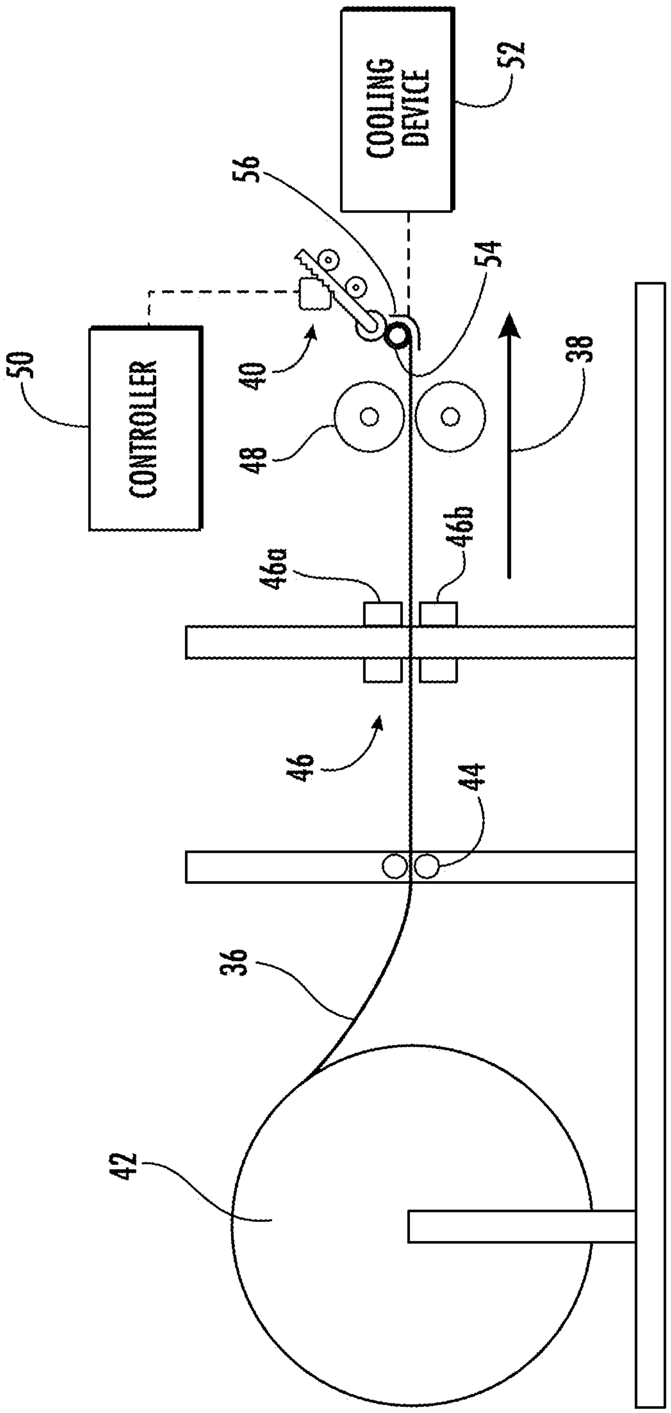
FIG. 3 is schematic view of an embodiment of an apparatus for manufacturing the gradient density depth filtration media of the filter element of FIG. 1.

Turning now to FIG. 3, the same illustrates a schematic illustration of an apparatus for forming filter element 20 according to the methods described herein. As may be seen in this view, a layer of filter media material 36 (referred to herein as layer 36) moves in direction 38. Layer 36 is unwound from a roll of filter media 42 as shown. Roll 42 may be premanufactured filtration media stock, for example, polymeric or nonpolymeric filtration fibers formed into a layer by any known filtration media formation technology, such as for non-limiting example, spunbonding, melt blowing, etc.

Layer 36 is fed along direction 38 using one or more sets of feed rollers 44. Prior to reaching a compression arrangement 40 described below, layer 36 is heated by a heating element 46. In the illustrated embodiment, heating element 46 includes an upper heating element 46*a* positioned above a top surface of layer 36, and a lower heating element 46*b*, positioned below a bottom surface of layer 36. These heaters 46*a*, 46*b* are positioned such that both sides of layer 36 are heated.

Heating elements 46*a*, 46*b* are positioned such that they produce enough energy to heat the fibers of layer 36 to a pre-molten state. This allows the fibers to generally maintain their shape, but adhere to one another during subsequent compression as described below. After being heated, layer 36 may pass through one or more sets of pinch rollers 48 as shown. Thereafter, layer 36 is wound into a cylindrical roll 54 in order to form the overall shape of the filter media for use.

As the cylindrical roll 54 is formed, a compression arrangement 40 exerts a compressive force against roll 54. Due to the pre-molten and heated state of layer 36, this compression forms a denser more compacted matrix than if no compression were present. This compression arrangement may employ a variable compressive force such that the cylindrical roll 54 may have a density gradient radially, i.e. through its wall thickness, and/or axially.

Once formed, the cylindrical roll 54 may then be removed from the winding element it is being formed upon and pass into a cooling device 52 to set the fibers and thus the final shape of cylindrical roll 54. Alternatively, cooling device 52 may be positioned such that it cools cylindrical roll 54 while it is being formed, post compression. Not shown in FIG. 3 is an optional sizing arrangement which may be used to cut or trim the overall length of cylindrical roll 54 into the axial dimensions desired.

The compressive force applied by compression arrangement 40 may be controlled by a controller 50. Controller 50 may be a centralized controller, responsible for controlling the entirety of the formation process as described above, or may be a stand-alone controller utilized primarily compression control. In either case, the term "controller" means any software, hardware, firmware, or combination thereof responsible for controlling the functionality described herein. Controller 50 may take inputs from one or more sensors to monitor a state of cylindrical roll 54 while it is being formed, and use that state information to govern the amount of compression applied by compression arrangement 40. Controller 50 may operate upon a closed or open loop principle.

For example, controller 50 may include a lookup table that correlates a desired compressive force to one more parameters such as media type, current cylindrical 54 roll diameter, etc. Based on this information, controller 50 can direct the amount of compressive force applied by compression arrangement 40.

Figure 4:
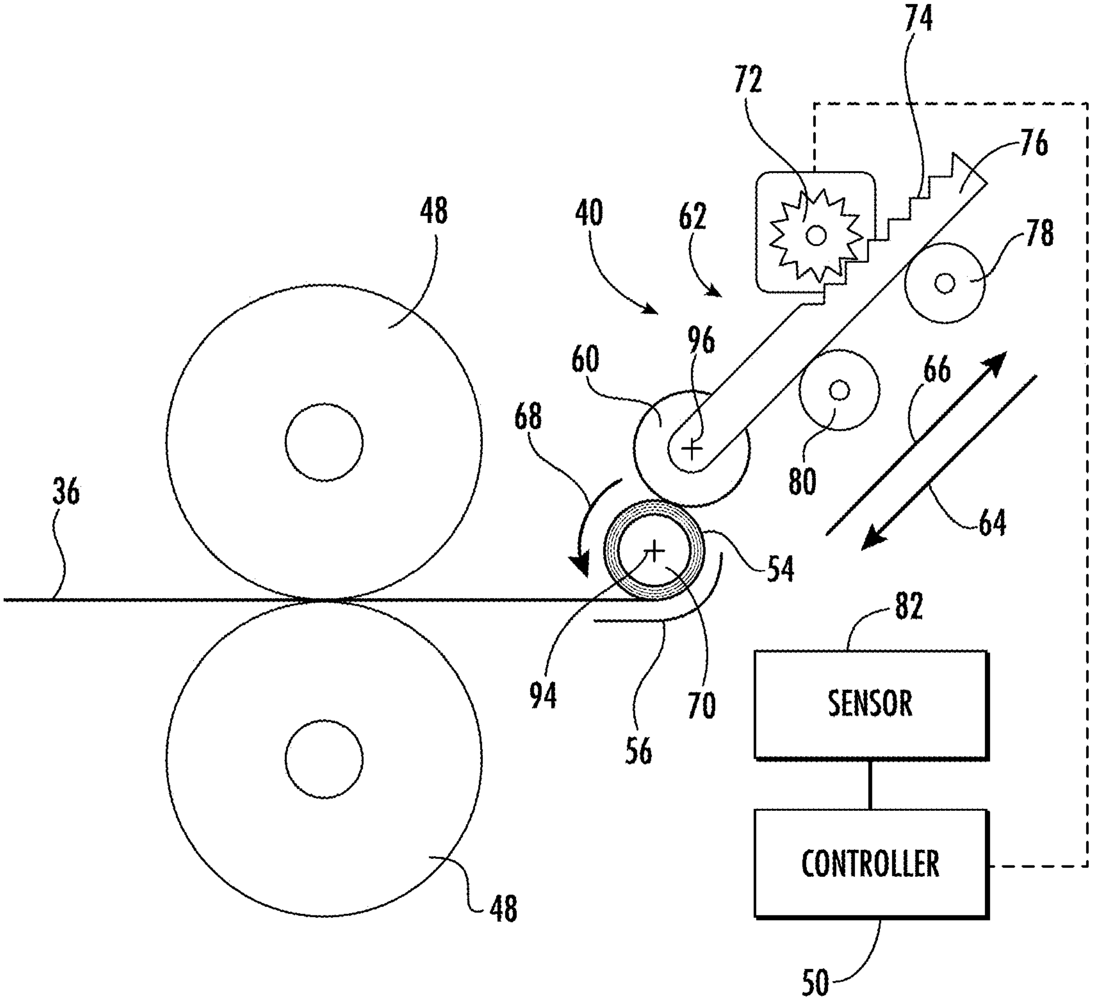
FIG. 4 is a schematic view of a section of the apparatus of FIG. 3, which in particular illustrates one embodiment of a compression roller arrangement thereof.

Turning now to FIG. 4, the same illustrates compression arrangement 40 in greater detail. Layer 36 passes through pinch rollers 48 and is guided by a guiding element 54 onto winding element 70, where it is wound into a cylindrical roll 54. Compression arrangement 40 includes a compression roll 60 attached to an actuation arrangement 62. In the illustrated embodiment, actuation arrangement 62 comprises a rack and pinion arrangement. A pinion 72 is in meshed contact with a rack 74 formed on an actuating arm 76 carrying compression roller 60. Support rollers 78, 80 may also be employed for supporting actuation arm 76.

Rotation of pinion 72 while in meshed contact with rack 74 causes compression roller 60 to move in directions 64, 66 as shown, to ultimately vary a compressive force applied by compression roller 60 against cylindrical roll 54. Put differently, actuation of the above described rack and pinion device changes a distance between an axis of rotation 94 of winding element 70 carrying that cylindrical roll 54 is being wound upon, and an axis of rotation 96 of compression roll 60 as shown. Winding element 70 may be configured to withstand this compressive force applied by compression roll 60 such that a portion of cylindrical roll 54 is compressed as it passes through the radial space between compression roll 60 and winding element 70.

One or more sensors 82 may be positioned to collect information regarding the operation of compression arrangement 40, for example one or more current states of cylindrical roll 54, and relay this information to controller 50. As described above, controller 50 is operable to control the operation of compression arrangement 40 to govern the overall compressive force applied thereby. As one example, controller 50 may be configured to control a motor used for rotating pinion 72.

Figure 5:
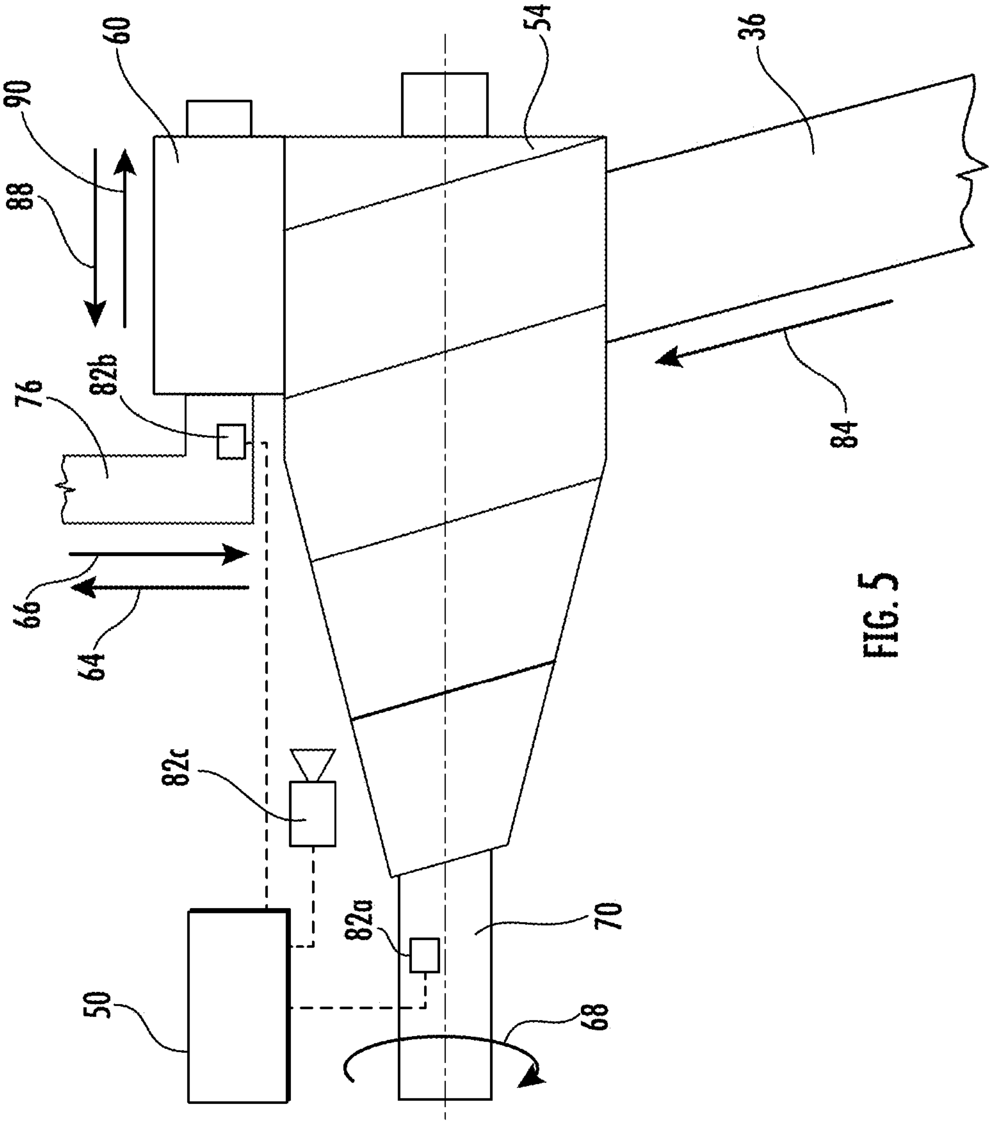
FIG. 5 is a plan view of the compression roller arrangement of FIG. 4

Turning now to FIG. 5, the same shows a partial view of compression roller 60 in contact with cylindrical roll 54 as it is being wound upon winding element 70. As layer 36 moves in direction 84 under rotation of winding element 70 in direction 68 as shown, compression roller 60 presses against the exterior of cylindrical roll 54 to compress the same. This action may be monitored by sensor(s) 82. For example, sensor 82 may include a sensor 82*a* mounted or in communication with winding element 70 to sense the compressive force applied by compression roller 60. Similarly, a sensor 82*b* may be mounted on or in communication with actuation arm 76 to sense the compressive force applied by compression roller 60. For non-limiting example, sensors 82*a*, 82*b* may be for example strain gauges, position sensors, etc. Further, visual information may be collected by a sensor 82*c* such as a camera, laser measurement system, etc., that corresponds to a current diameter cylindrical roll 54.

Indeed, it is contemplated that the density gradient of cylindrical roll 54 may vary in the radial direction, i.e. across the wall thickness of cylindrical roll 54, so monitoring its current diameter is useful in determining a current compressive force which should be applied to achieve a desired density. As compression roller 60 exerts a compressive force against cylindrical roll 54, this will compact overlapping wound layers of fibers that remain in a pliable yet pre-molten state together to increase density and decrease porosity. As one example of many, a cylindrical roll 54 of filter media formed as such may exhibit a porous and less dense formation near its outer periphery and a less porous, denser formation near its core. This will act to capture large particles near the exterior of cylindrical roll 54, and still capture smaller particles near the core.

Each of sensors 82*a*, 82*b*, 82*c*, can relay their respective information to controller 50, and controller 50 can move compression roller 60 in directions 64, 66 as described above. Further, compression arrangement 40 may be mounted to a gantry, robotic arm, etc. which also allows for movement axially in directions 88, 90. This allows for different compressive forces to be applied axially along the length of cylindrical roll 54. It should be noted that the relative size of compression roller 60 to cylindrical roll 54 is purely exemplary. Compression roller 60 may for example extend the entire length of cylindrical roll 54. Still further, more than a single compression roller 60 may be employed.

Figure 6:
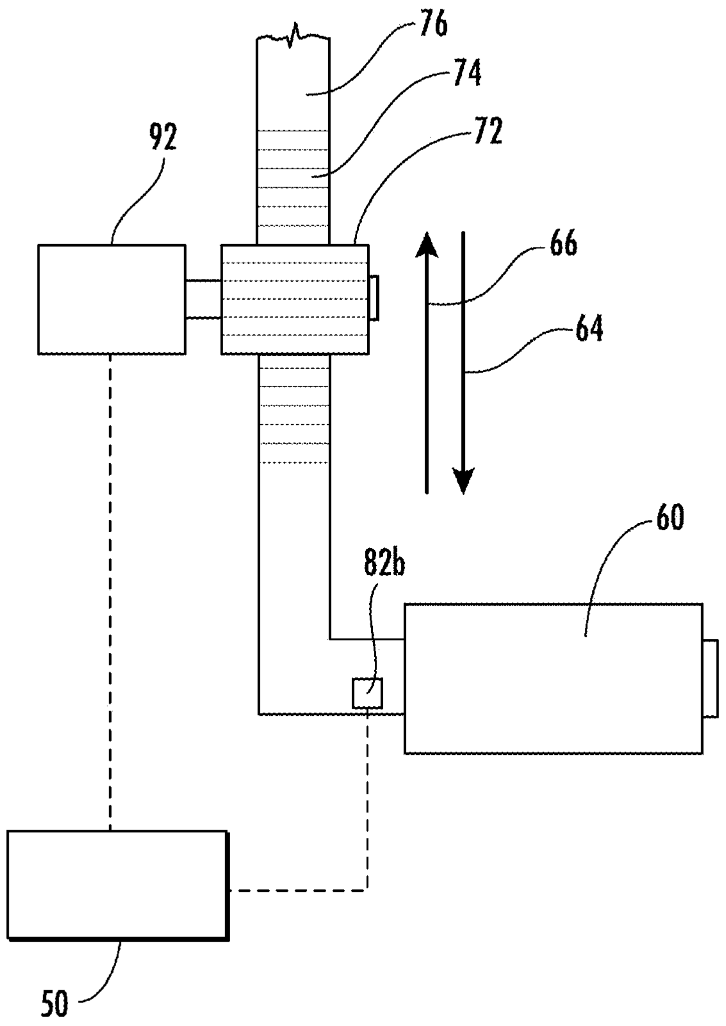
FIG. 6 is a top view of one exemplary embodiment of an actuation arrangement of the compression roller arrangement.
Figure 7:
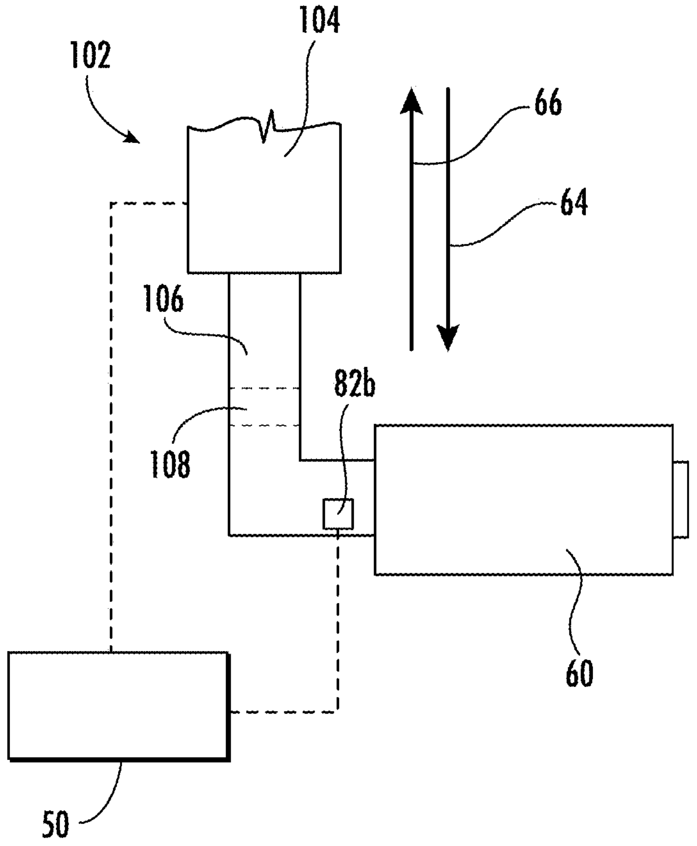
FIG. 7 is a top view of another exemplary embodiment of an actuation arrangement of the compression roller arrangement.

FIG. 6 illustrates another view of the above-introduced rack and pinion arrangement. A motor 92 is in communication with controller 50 for rotating pinion 72 to effectuate linear movement in directions 64, 66. FIG. 7 illustrates a an alternative embodiment of an actuation arrangement that includes a linear actuator 102 instead of a rack and pinion as described above. In this embodiment, linear actuator 102 includes a fixed cylinder 104 and an actuating arm 106 movable relative to the fixed cylinder. Compression roller 60 may be mounted directly to actuating arm 106, or may be a separate component mounted to actuating arm 106 by way of a collar 108 or the like. Controller 50 is operable to collect information from sensor(s) 82 as described above, and control the operation of linear actuator 102.

All references, including publications, patent applications, and patents cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing a depth-type filter cartridge, comprising the steps of:

exposing a layer of filter media material including polymeric material to a heat source to heat the polymeric material to a pre-molten state;

forming the filter media material into a cylindrical roll having a desired porosity and density using variable compression against the layer of filter media material as it is being wound into the cylindrical roll based on at least one of a current diameter of the media roll and the media material; and subsequently cooling the cylindrical roll to set fibers comprising the filter media material;

wherein the layer of filter media material is only heated to a pre-molten state while the method of manufacturing the depth-type filter cartridge is performed.

2. The method of claim 1, wherein the step of exposing a layer of polymeric or non-polymeric filter media material to a heat source includes exposing the layer to radiant heat generated by one or more heat lamps.

3. The method of claim 2, wherein the step of exposing the layer to radiant heat generated by one or more heat lamps includes utilizing a heat lamp above a top surface of the layer, and below a bottom surface of the layer.

4. The method of claim 1, wherein the step of using variable compression includes applying a compressive force against the cylindrical roll of filter media material while the layer of filter media material is being wound into the cylindrical roll.

5. The method of claim 4, wherein the step of applying the compressive force includes applying a compressive force with a compression roller arranged adjacent to the cylindrical roll.

6. The method of claim 5, wherein the step of applying the compressive force with a compression roller includes compressing a portion of the cylindrical roll of filter media material between an outer diameter of the compression roller and an outer diameter of a winding element upon which the layer of filter media material is being wound.

7. The method of claim 5, wherein the step of applying the compressive force with a compression roller includes varying the compressive force.

8. The method of claim 7, wherein the step of varying the compressive force includes moving the compression roller toward or away from the cylindrical roll.

9. The method of claim 8, wherein the step of moving the compression roller toward or away from the cylindrical roll includes changing a distance between a rotational axis of the compression roller and a rotational axis of a winding element upon which the layer of filter media material is being wound.

10. The method of claim 9, wherein the step of changing the distance includes using a motor to change the distance.

11. The method of claim 9, wherein the step of changing the distance includes using a linear actuator to change the distance.

12. The method of claim 1, wherein the step of using variable compression against the layer of filter media material as it is being wound into the cylindrical roll based on at least one of a current diameter of the media roll and the media material includes monitoring a current state of the cylindrical roll of filter media using one or more sensors and communicating information pertaining of the current state to a controller.

13. The method of claim 12, further comprising a step of varying a compressive force by sending an instruction from the controller to an actuation arrangement.

14. The method of claim 1, wherein the layer of filter media material additionally includes non-polymeric material.

* * * * *